(12) United States Patent
Song et al.

(10) Patent No.: US 11,965,620 B2
(45) Date of Patent: Apr. 23, 2024

(54) PIPELINE PATROL INSPECTION ROBOT HAVING VARIABLE TRACKS AND CONTROL METHOD THEREFOR

(71) Applicant: SOUTHEAST UNIVERSITY, Nanjing (CN)

(72) Inventors: Aiguo Song, Nanjing (CN); Tianyuan Miao, Nanjing (CN); Bincheng Shao, Nanjing (CN); Baoguo Xu, Nanjing (CN); Guangming Song, Nanjing (CN); Bo Xu, Nanjing (CN); Shuang Liu, Nanjing (CN); Jihai Min, Nanjing (CN)

(73) Assignee: SOUTHEAST UNIVERSITY, Nanjing (CN)

( * ) Notice: Subject to any disclaimer, the term of this patent is extended or adjusted under 35 U.S.C. 154(b) by 0 days.

(21) Appl. No.: 17/635,967

(22) PCT Filed: Jan. 4, 2021

(86) PCT No.: PCT/CN2021/084851
§ 371 (c)(1),
(2) Date: Feb. 16, 2022

(87) PCT Pub. No.: WO2022/198714
PCT Pub. Date: Sep. 29, 2022

(65) Prior Publication Data
US 2022/0373122 A1      Nov. 24, 2022

(30) Foreign Application Priority Data
Mar. 24, 2021   (CN) .......................... 202110312255.1

(51) Int. Cl.
*F16L 55/28*       (2006.01)
*B25J 11/00*       (2006.01)
*F16L 101/30*      (2006.01)

(52) U.S. Cl.
CPC .............. *F16L 55/28* (2013.01); *B25J 11/008* (2013.01); *F16L 2101/30* (2013.01)

(58) Field of Classification Search
CPC ...... B25J 11/008; F16L 55/40; F16L 2101/30; G01N 21/954; G01N 2291/2636; G01N 2021/9548; G01N 2223/628
(Continued)

(56) References Cited

U.S. PATENT DOCUMENTS

| 2013/0104676 A1 | 5/2013 | Yang et al. |
| 2018/0313715 A1 | 11/2018 | Cichosz et al. |
| 2019/0178433 A1* | 6/2019 | Donovan .............. E21B 17/006 |

FOREIGN PATENT DOCUMENTS

| CN | 201462867 U | * | 5/2010 |
| CN | 103672289 A | | 3/2014 |

(Continued)

*Primary Examiner* — Daniel S Larkin
*Assistant Examiner* — Nashmiya S Fayyaz
(74) *Attorney, Agent, or Firm* — MUNCY, GEISSLER, OLDS & LOWE, P.C.

(57) ABSTRACT

The present invention discloses a pipeline patrol inspection robot having variable tracks and a control method therefor. The pipeline patrol inspection robot of the present invention includes a robot body, track assemblies symmetrically disposed on a left side and a right side of the robot body, and a movement driving mechanism. The robot body is connected to the track assemblies on the left side and the right side by track fixtures, and track angle adjusting mechanisms are respectively connected between the robot body and the track assemblies on the left side and the right side. By means of the present invention, a track camber angle can be adjusted. In addition, each track angle adjusting mechanism is independent, and has desirable flexibility to adapt to different pipeline environments.

6 Claims, 6 Drawing Sheets

(58) Field of Classification Search
USPC .............................................. 73/40.5, 865.8
See application file for complete search history.

(56) References Cited

FOREIGN PATENT DOCUMENTS

| | | | |
|---|---|---|---|
| CN | 104477264 A | | 4/2015 |
| CN | 106114661 A | | 11/2016 |
| CN | 206230509 U | | 6/2017 |
| CN | 206514002 U | | 9/2017 |
| CN | 108980511 A | | 12/2018 |
| CN | 209385918 U | * | 9/2019 |
| CN | 110920766 A | | 3/2020 |
| CN | 111156368 A | | 5/2020 |
| CN | 111288246 A | | 6/2020 |
| CN | 211118279 U | | 7/2020 |
| CN | 112066157 A | | 12/2020 |
| CN | 113002644 A | | 6/2021 |
| CN | 214531064 U | * | 10/2021 |
| WO | WO2013108951 A1 | | 7/2013 |

* cited by examiner

PIPELINE PATROL INSPECTION ROBOT HAVING VARIABLE TRACKS AND CONTROL METHOD THEREFOR

TECHNICAL FIELD

The present invention relates to a pipeline patrol inspection robot having variable tracks and a control method therefor, and belongs to the technical field of robots.

BACKGROUND

As the automation level advances and the demand for material transportation increases, pipeline transportation has been widely used fields such as oil, natural gas, water supply, and nuclear industry by virtue of advantages such as a large transportation amount, low costs, and a high transportation speed. However, during pipeline transportation, pipeline erosion and damage, material residues in a pipeline may occur, resulting in material leakage, blockage, and the like. Pipelines require regular inspection. Traditional manual inspection has low efficiency, high difficulty, and a limited manual measurement range. It is necessary to design a pipeline patrol inspection robot to complete the pipeline inspection task in replacement of humans.

Current common pipeline patrol inspection robots include a wheeled robot, a track robot, and an abdominal robot. The wheeled robot cannot adapt to the obstacle crossing inside the pipeline and a diameter-varying transition area of the pipeline. The track robot has higher motility during inspection in the pipeline by virtue of a strong gripping ability. However, a track angle is required to be adjusted so that a track surface comes into contact with a pipe wall to improve the transmission efficiency. The abdominal robot sticks to an inner wall of the pipeline by extending mechanical arms, which requires a plurality of drives, has low efficiency, and is difficult to control.

The Chinese Patent Application No. 201310690872.0, which is authorized on Jan. 21, 2015, discloses a track angle-adjustable pipeline robot. By adjusting a gear on a rotary shaft, a left main track and a right main track may be adjusted outward to a specific angle into a splayed shape, so that a track surface comes into contact with a pipe wall. The robot has desirable adaptability to the pipe wall. However, mechanisms of the pipeline robot mechanism have some disadvantages: First, an exposed gear transmission mechanism is vulnerable to erosion and has large mechanical wear, which greatly affects track angle adjustment in the present invention. Second, by adjusting the camber angle of the track by gear transmission, the outward camber angles of the left track and the right track are the same, so that the robot is pretty stable during movement. However, in some irregular pipelines, the limitation of angle adjustment leads to insufficient contact between the track on one side and the wall surface. Thirdly, the left track and the right track and the frame are designed as separate modules. A stepper motor driving the track to move is mounted in the track assembly. Some restrictions are imposed on a volume and a torque of the selected motor. In addition, a weight of the track assembly is increased, which brings a greater burden to adjustment of the track camber angle. The Chinese Patent Application No. 201810981630.X, which is published on Dec. 11, 2018 provides a novel pipeline robot. Two mirrored three-track moving mechanisms and a body are connected by universal joints, and a screw rod is controlled by a stepper motor to rotate to adjust an opening degree of a track foot. The robot has specific adaptability to a pipeline environment. However, selection of the driving motor for the track foot is limited and a torque of a driving wheel is insufficient.

The Chinese Patent Application No. 201811494015.2, which is published on Jun. 16, 2020, discloses a pipeline robot. A spring set at one end where each driving wheel is located is controlled to extend and withdraw to change a position of contact between each driving wheel and a pipe wall. Therefore, a plurality of driving wheels can all come into contact with the pipe wall, helping the pipe robot pass through a diameter-varying area. However, in the mechanism, complete contact between the driving wheel and the tube wall cannot be realized during adjustment of the spring set, and the driving wheel is worn to some extent during movement. The whole robot system is required to include not only a driving motor for movement but also a plurality of driving motors configured to adjust the spring set. The plurality of driving mechanisms are complex and are difficult to control, resulting in low working efficiency.

At present, how to cause the pipeline patrol inspection robot to automatically adjust the mechanism to adapt to the varying pipe diameter without manual intervention during movement is also a problem to be urgently resolved.

SUMMARY

For the above disadvantages of the prior art, the present invention provides a pipeline patrol inspection robot having variable tracks and a control method therefor. By means of the present invention, a driving capability is ensured, and insufficient contact between a track surface and a pipe wall is resolved. In addition, a method for automatically adjusting a mechanism to adapt to a varying pipe diameter.

To resolve the foregoing technical problem, a technical solution used in the present invention is as follows:

A pipeline patrol inspection robot having variable tracks includes a robot body, track assemblies symmetrically disposed on a left side and a right side of the robot body, and a movement driving mechanism. The robot body is connected to the track assemblies on the left side and the right side by track fixtures, and track angle adjusting mechanisms are respectively connected between the robot body and the track assemblies on the left side and the right side. Each of the track angle adjusting mechanisms includes a sliding rail connected to the robot body. A push rod motor is mounted to the sliding rail. A power output shaft of the push rod motor drives a slidable block movable back and forth on the sliding rail. A four-link mechanism is mounted to the slidable block. The four-link mechanism includes a lower link, an upper link, and two side links. One end of the lower link is mounted to a lower pin shaft by using a revolute pair, and an other end is mated with a ball head of one of the track assemblies. Lower parts of the two side links are connected to the lower pin shaft by the revolute pair, and upper parts are connected to an upper pin shaft by the revolute pair. The upper link is mounted to the upper pin shaft by the revolute pair, and an other end is mated with the ball head of the track assembly.

According to the pipeline patrol inspection robot having variable tracks, each of the track assemblies includes a driving wheel, a tensioner, a support wheel, and a track fixing side plate. The track fixing side plates are respectively disposed on inner sides of the track assemblies on both sides, the driving wheel and the tensioner are respectively located at a front end and a rear end of one of the tracks, and the support wheel is disposed in the middle of the track.

According to the pipeline patrol inspection robot having variable tracks, a three-dimensional force sensor is disposed on the tensioner of each of the track assemblies on the left side and the right side.

According to the pipeline patrol inspection robot having variable tracks, the movement driving mechanism includes two movement driving mechanisms symmetrically disposed on a front of the robot body and each including a servo motor, a reinforcing link, and a universal joint. The servo motor is fixed to an inner bottom plate of the robot body and is connected to the reinforcing link. One end of the universal joint is connected to the reinforcing link, and an other end is connected to the track driving wheel.

According to the pipeline patrol inspection robot having variable tracks, the track fixtures include four track fixtures symmetrically mounted in the robot body in front-to-rear and left-to-right directions. A symmetrical plane where the track fixtures are mounted in the front-to-rear direction is a plane where the four-link mechanism is located. A mounting height is a height of a transverse central axis of the track fixing side plate. Each of the track fixtures has a herringbone structure. One end is hinged to the track fixing side plate by using a spherical hinge, and two branches protruding from an other end are connected to the robot body.

According to the pipeline patrol inspection robot having variable tracks, the ball head of the track assembly is disposed on the track fixing side plate.

A control method for the pipeline patrol inspection robot having variable tracks is provided. The method includes the following steps:

step 1: sampling Y-axis direction force values and Z-axis direction force values outputted by a three-dimensional force sensor at a sampling frequency of 100 Hz, and performing filtering by using a median averaging algorithm to obtain a Y-axis direction force $F_{Y1}$ and a Z-axis direction force $F_{Z1}$ of a left track and a Y-axis direction force $F_{Y2}$ and a Z-axis direction force $F_{Z2}$ of a right track;

step 2: calculating a ratio of the Y-axis direction force to the Z-axis direction force for each of the left track and the right track, which are α1 and α2, where $$\alpha_1 = \frac{F_{Y1}}{F_{Z1}}, \alpha_2 = \frac{F_{Y2}}{F_{Z2}} \quad (1)$$

step 3: calculating a determination basis for track camber angle adjustment, and selecting a proper control algorithm:

$$\Delta_1 = |\alpha_1| - \delta \quad (2)$$

$$\Delta_2 = |\alpha_2| - \delta \quad (3)$$

$$\eta = \alpha_1 \alpha_2 \quad (4)$$

$$\mu = \Delta_1 - \Delta_2 \quad (5)$$

where δ is a set positive threshold, and when $\alpha_1 > \delta$ and $\alpha_2 > \delta$, the left track and the right track are both required to be expanded outward;

when $-\alpha_1 > \delta$ and $-\alpha_2 > \delta$, the left track and the right track are both required to be retracted inward;

in the above two states, the two push rod motors are simultaneously controlled by using a gradient descent method, to adjust a track camber angle to quickly approximate an optimal state, that is, $\Delta_1 \leq 0$ or $\Delta_2 \leq 0$;

in case of approximating the optimal state, that is, $\Delta_1 \leq 0$ or $\Delta_2 \leq 0$, or when the left track and the right track are both required to be adjusted clockwise/counterclockwise, that is, $\Delta_1 > 0$, $\Delta_2 > 0$, and $\eta < 0$, a "fixing one while moving the other" PI control method is adopted, and the "fixing one while moving the other" PI control method includes the following: if $\mu > 0$, PI control is performed on only a left push rod motor to adjust a camber angle of the left track so that $\alpha_1 = 0$, and on the contrary, PI control is performed on only a right push rod motor to adjust a camber angle of the right track so that $\alpha_2 = 0$, until an optimal state of contact between a track surface and a pipe wall is realized, that is, $\alpha_1 = 0$ and $\alpha_2 = 0$; and step 4: when the pipeline patrol inspection robot passes through a diameter-varying area of a pipeline or an irregular pipeline area, automatically monitoring a state of the contact between the track and the pipe wall by steps 1-3, if it is detected that the track is in a non-optimal state, first adjusting the universal joint to a proper angle by using a servo motor, and then automatically adjusting the track camber angle to the optimal state by using the track angle adjusting mechanism.

The above steps 1-4 are adaptive adjustment steps of the track camber angle, the movement of the pipeline patrol inspection robot is realized by the movement driving mechanism, and steering of the vehicle body is controlled by using a left and right track differential method.

Beneficial Effects:

1. According to the present invention, the planar four links are combined with the push rod motor, and the track assemblies are docked by using spherical hinges. Therefore, a track camber angle can be adjusted. In addition, each track angle adjusting mechanism is independent, and has desirable flexibility to adapt to different pipeline environments.

2. According to the present invention, the three-dimensional force sensor is used, which is mounted to a tensioner of each track. Therefore, the force value in each axial direction can be measured accurately, and a current state of contact between each track and the pipe wall can be determined.

3. According to the present invention, gradient descent and PI control are combined, so that the track camber angle can be automatically adjusted to cause the track surface to come into contact with the pipe wall. Adjustment of the track camber angle is realized by the track angle adjusting mechanism. Adjustment of the camber angle of the left track is used as an example. When the push rod motor pushes the slidable block leftward, the planar four-link mechanism is driven, and the track fixing side plate and the track are caused to rotate clockwise about the transverse central axis by the spherical hinge, or vice versa. The track camber angle adjustment is based on the mechanisms of the pipeline patrol inspection robot. By limiting a stroke of the slidable block in the track angle adjusting mechanism, maximum adjustment angles in forward and reverse directions of the track can be limited. In this way, the wear of the track is reduced, the energy loss is reduced, and the working efficiency of the pipeline patrol inspection robot is improved.

4. In the present invention, each track assembly and the robot body are hinged by a set of spherical hinges. A hinged position is on the transverse central axis of the track fixing side plate. In this way, the track camber angle adjustment is limited, the push-pull force on the planar four-link is reduced, and the energy consumption of the camber angle adjustment is reduced.

5. According to the track camber angle adjustment manner in the present invention, the movement driving mechanism is disposed inside the robot body, and the track driving wheel is connected by the universal joint. In this way, the track angle may be adjusted and the driving ability of the track can be ensured.

BRIEF DESCRIPTION OF THE DRAWINGS

FIG. 6 (a) is a schematic diagram of the state before the track camber angle is adjusted, and FIG. 6 (b) is a schematic diagram of the state after the track camber angle is adjusted.

REFERENCE NUMERALS

1: Robot body;
11: Track fixture;
12: Track angle adjusting mechanism;
121: Push rod motor;
122: Slidable block;
123: Sliding rail;
124: Upper link;
125: Lower link;
126: Side link;
127: Upper pin shaft;
128: Lower pin shaft;
129: Spherical groove;
2: Track assembly;
21: Driving wheel;
22: Tensioner;
23: Support wheel;
24: Track fixing side plate;
25: Three-dimensional force sensor;
26: Transverse central axis of fixing side plate;
3: Movement driving mechanism;
31: Servo motor;
32: Reinforcing link;
33: Universal joint.

DETAILED DESCRIPTION

The following further describes the present invention in detail with reference to the accompanying drawings in the specification and preferred embodiments.

Figure 1:
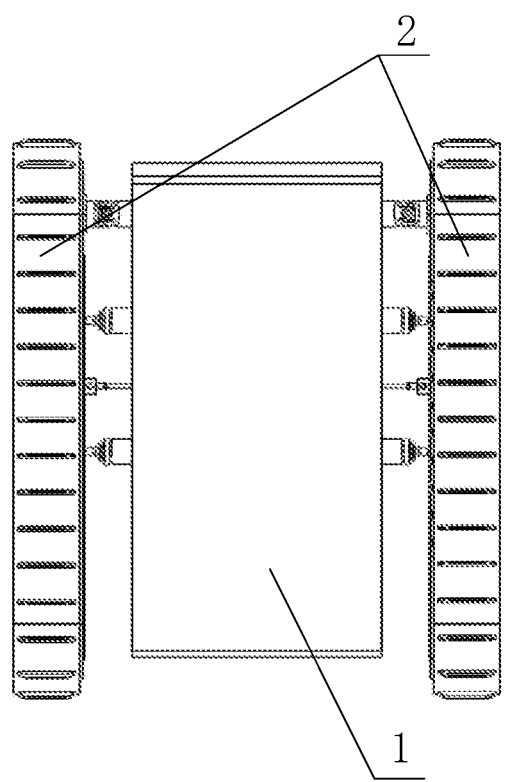
FIG. 1 is a top view of mechanisms of a pipeline patrol inspection robot having variable tracks according to the present invention.
Figure 2:
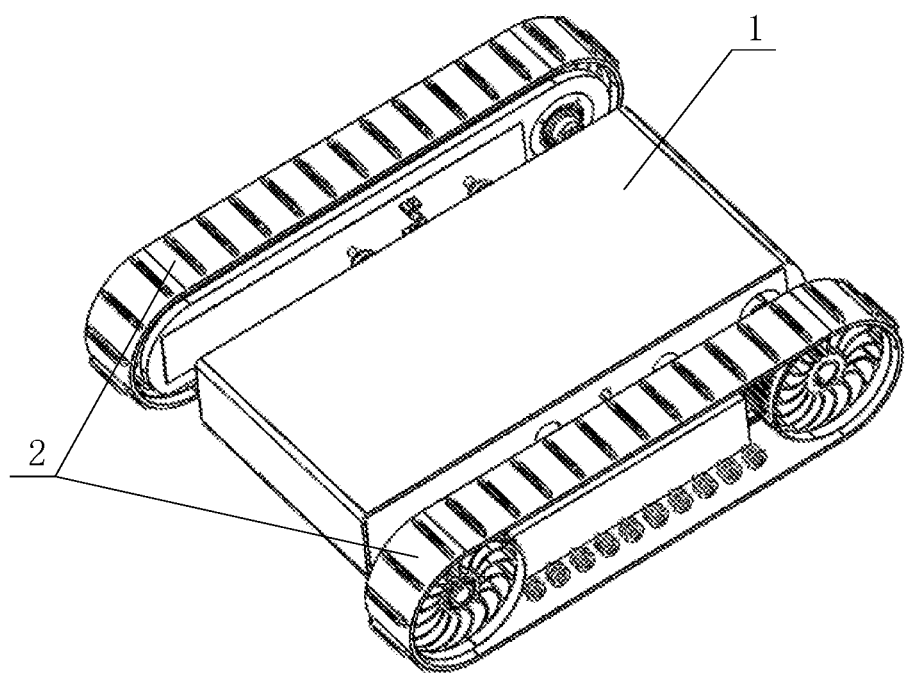
FIG. 2 is a side view of the mechanisms of the pipeline patrol inspection robot mechanism having variable tracks according to the present invention.
Figure 3:
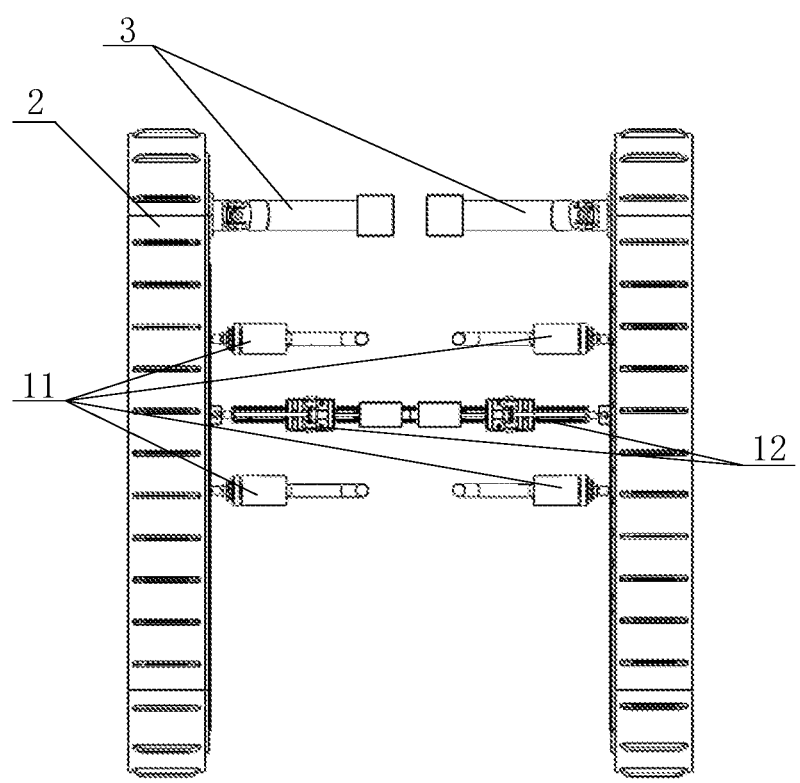
FIG. 3 is a schematic structural top view of the mechanisms of the pipeline patrol inspection robot mechanism having variable tracks according to the present invention.
Figure 4:
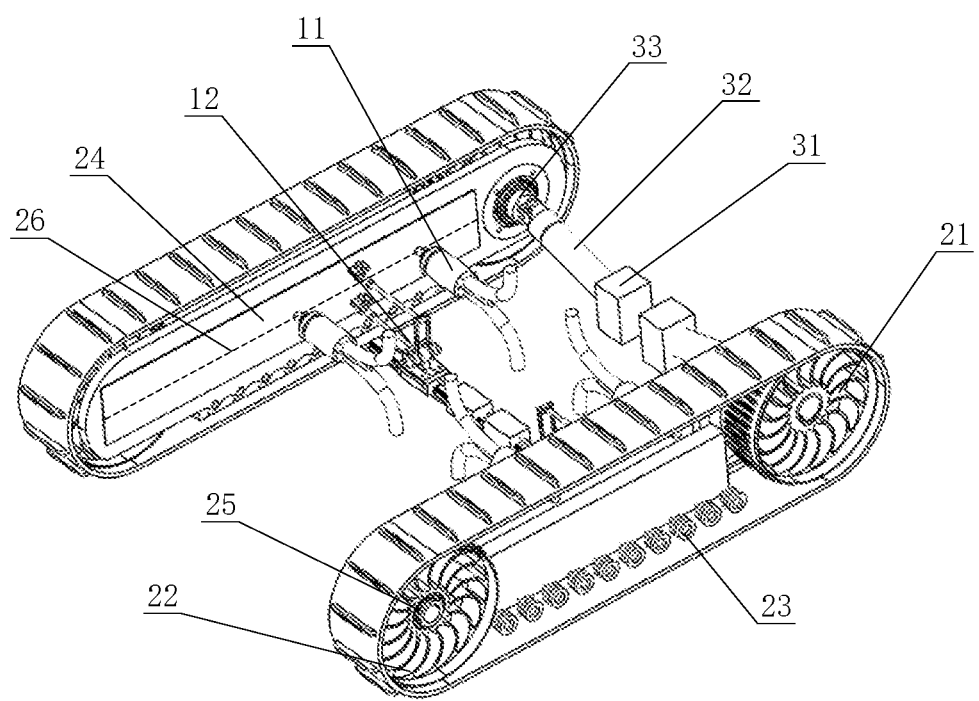
FIG. 4 is a schematic structural side view of the mechanisms of the pipeline patrol inspection robot mechanism having variable tracks according to the present invention.
Figure 5:
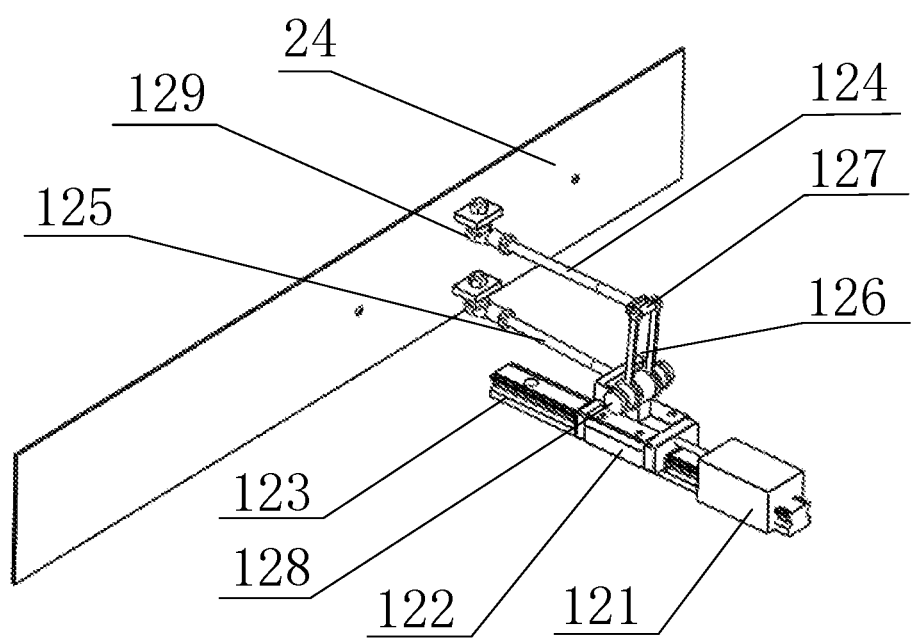
FIG. 5 is a schematic structural diagram of a track angle adjusting mechanism.
Figure 6:
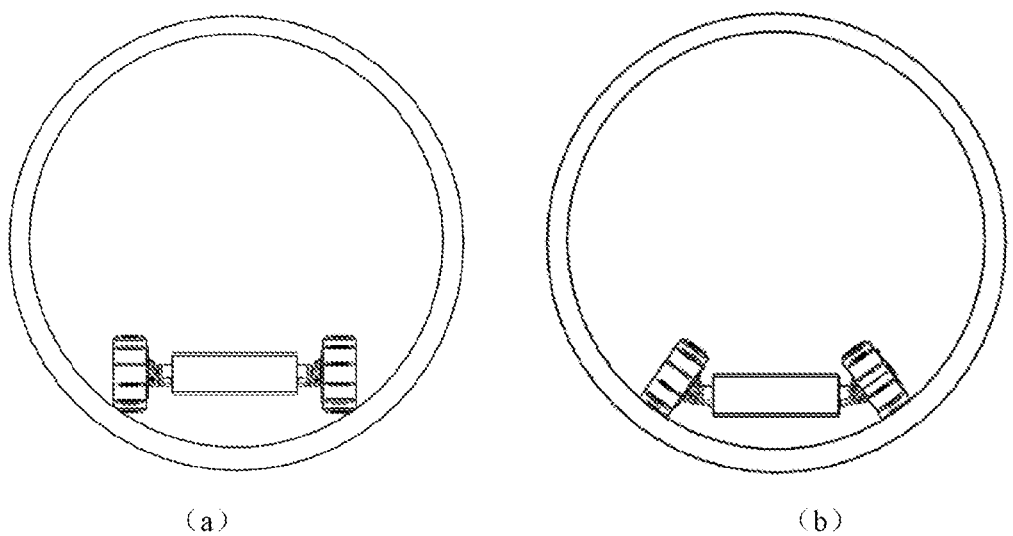
FIG. 6 are schematic diagrams of states before and after a pipeline patrol inspection robot automatically adjusts a track camber angle inside a pipeline to adapt to a pipe wall.

As shown in FIG. 1 and FIG. 2, a pipeline patrol inspection robot mechanism having variable tracks includes a robot body 1, track assemblies 2 on a left side and a right side, and a movement driving mechanism 3. The robot body is connected to the track assemblies on the left side and the right side by track fixtures 11, and track angle adjusting mechanisms 12 are respectively connected between the robot body and the track assemblies on the left side and the right side.

The track fixtures include four track fixtures symmetrically mounted in the robot body in front-to-rear and left-to-right directions, a symmetrical plane where the track fixtures are mounted in the front-to-rear direction is a plane where the four-link mechanism is located, a mounting height is a height of a transverse central axis 24 of the track fixing side plate. In this way, the track camber angle adjustment is limited, the push-pull force on the planar four links is reduced, and the energy consumption of the camber angle adjustment is reduced.

Each of the track fixtures has a herringbone structure. One end is hinged to the track fixing side plate by using a spherical hinge, and two branches protruding from an other end are connected to the robot body.

The track angle adjusting mechanism includes two track angle adjusting mechanisms symmetrically mounted in the middle of the robot body. Each of the track angle adjusting mechanisms includes a sliding rail 123 connected to the robot body. A push rod motor 121 is mounted to the sliding rail. A power output shaft of the push rod motor drives a slidable block 122 movable back and forth on the sliding rail. A four-link mechanism is mounted to the slidable block. The four-link mechanism includes a lower link 125, an upper link 124, and side links 126. One end of the lower link is mounted to a lower pin shaft 128 by using a revolute pair. An other end is a spherical groove mated with a ball head of one of the track assemblies. Lower parts of the two side links are connected to the lower pin shaft by the revolute pair. Upper parts are connected to an upper pin shaft 127 by the revolute pair. The upper link is mounted to the upper pin shaft by the revolute pair. An other end is a spherical groove mated with the ball head of the track assembly.

The upper link 124 and the lower link 125 of the planar four links pass through a housing of the robot body, and a transmission gap is retained between the upper link and the lower link and the housing of the robot body. According to the present invention, the planar four links are combined with the push rod motor, and the track assemblies are docked by using spherical hinges. Therefore, a track camber angle can be adjusted. In addition, each track angle adjusting mechanism is independent, and has desirable flexibility to adapt to different pipeline environments.

Each of the track assemblies includes a driving wheel 21, a tensioner 22, a support wheel 23, and a track fixing side plate 24. The track fixing side plates are respectively disposed on inner sides of the track assemblies on both sides. The driving wheel and the tensioner are respectively located at a front end and a rear end of one of the tracks. The support wheel is disposed in the middle of the track. The track fixing side plate has four ball heads. The front and rear ball heads are larger, and are configured to be docked with the track fixture. The upper and lower ball heads are smaller, and are configured to be docked with the planar four links. Mounting holes of the front and rear ball heads are located on the transverse central axis of the track fixing side plate, and are symmetrical with each other on both sides of the planar four links. Mounting holes of the upper and lower ball heads are symmetrical in an up-and-down direction, and an axis of symmetry is the transverse central axis of the track fixing side plate.

A three-dimensional force sensor is installed at the tensioner of each track, and is configured to accurately measure a force value in each axial direction.

The movement driving mechanism includes two movement driving mechanisms symmetrically disposed on a front of the robot body and each including a servo motor 31, a reinforcing link 32, and a universal joint 33. The servo motor is fixed to an inner bottom plate of the robot body. One end of the universal joint is connected to the reinforcing link, and an other end is connected to the track driving wheel.

A fixing position of the universal joint penetrates the housing of the robot body, and a transmission gap is retained between the fixing position and the housing of the body.

The present invention further provides a control method for a pipeline patrol inspection robot having variable tracks. The control method is based on a three-dimensional force sensor and combines gradient descent with PI control (proportional-integral control) to automatically adjust a track camber angle to cause a track surface to come into contact with a pipe wall.

A control method for a pipeline patrol inspection robot having variable tracks includes the following steps.

Step 1: Sampling Y-axis direction force values and Z-axis direction force values outputted by a three-dimensional force sensor at a sampling frequency of 100 Hz, and performing filtering by using a median averaging algorithm to obtain a Y-axis direction force $F_{Y1}$ and a Z-axis direction force $F_{Z1}$ of a left track and a Y-axis direction force $F_{Y2}$ and a Z-axis direction force $F_{Z2}$ of a right track.

Step 2: Calculating a ratio of the Y-axis direction force to the Z-axis direction force for each of the left track and the right track, which are $\alpha_1$ and $\alpha_2$, where $$\alpha_1 = \frac{F_{Y1}}{F_{Z1}}, \alpha_2 = \frac{F_{Y2}}{F_{Z2}}. \tag{1}$$

According to the control method for a pipeline patrol inspection robot having variable tracks of the present invention, the track camber angle can be adjusted to cause the track surface to come into contact with the pipe wall. Adjustment of the track camber angle is realized by the track angle adjusting mechanism. Adjustment of the camber angle of the left track is used as an example. When the push rod motor pushes the slidable block leftward, the planar four-link mechanism is driven, and the track fixing side plate and the track are caused to rotate clockwise about the transverse central axis by the spherical hinge, or vice versa.

According to the present invention, a current state of contact between each track and the pipe wall may be determined according to a returned force value of the three-dimensional force sensor.

The left track is used as an example. When only a left edge of the left track is in contact with the pipe wall, that is, $\alpha 1>0$, the left track is required to be rotated clockwise about the transverse central axis of the track fixing side plate, that is, the push rod is moved leftward. When the left edge and a right edge of the left track are both in contact with the pipe wall, that is, $\alpha_1=0$ (a very small fluctuation range is tolerable), the contact between the track surface and the pipe wall is in an optimal state. When only the right edge of the left track is in contact with the pipe wall, that is, $a_1<0$, the left track is required to be rotated counterclockwise about the transverse central axis of the track fixing side plate, that is, the push rod is moved rightward.

Step 3: Calculating a determination basis for track camber angle adjustment, and selecting a proper control algorithm:

$$\Delta_1 = |\alpha_1| - \delta \tag{2}$$

$$\Delta_2 = |\alpha_2| - \delta \tag{3}$$

$$\eta = \alpha_1 \alpha_2 \tag{4}$$

$$\mu = \Delta_1 - \Delta_2 \tag{5}$$

where $\delta$ is a set positive threshold, and when $\alpha_1 > \delta$ and $\alpha_2 > \delta$, the left track and the right track are both required to be expanded outward. When $-\alpha_1 > \delta$ and $-\alpha_2 > \delta$, the left track and the right track are both required to be retracted inward. In the above two states, the two push rod motors are simultaneously controlled by using a gradient descent method in the present invention, to adjust a track camber angle to quickly approximate the optimal state. In case of approximating the optimal state (that is, $\Delta_1 \leq 0$ or $\Delta_{2 \leq 0}$), or when the left track and the right track are both required to be adjusted clockwise (counterclockwise) (that is, $\Delta_1 > 0$, $\Delta_2 > 0$, and $\eta < 0$), a "fixing one while moving the other" PI control method is adopted. If $\mu > 0$, PI control is performed on only a left push rod motor to adjust a camber angle of the left track so that $\alpha_1 = 0$. On the contrary, PI control is performed on only a right push rod motor to adjust a camber angle of the right track so that as =0, until the optimal state ($\alpha_1 = 0$ and as =0) of contact between the track surface and the pipe wall is realized.

Step 4: When the pipeline patrol inspection robot passes through a diameter-varying area of a pipeline or an irregular pipeline area, automatically monitoring a state of the contact between the track and the pipe wall by steps 1-3, if it is detected that the track is in a non-optimal state, first adjusting the universal joint to a proper angle by using a servo motor, and then automatically adjusting the track camber angle to the optimal state by using the track angle adjusting mechanism.

The above steps 1-4 are adaptive adjustment steps of the track camber angle, the movement of the pipeline patrol inspection robot is realized by the movement driving mechanism, and steering of the vehicle body adopts a left and right track differential method.

Gradient descent and PI control are combined, so that the track camber angle can be automatically adjusted to cause the track surface to come into contact with the pipe wall. In this way, the wear of the track is reduced, the energy loss is reduced, and the working efficiency of the pipeline patrol inspection robot is improved.

The track camber angle adjustment is based on the mechanisms of the pipeline patrol inspection robot. By limiting a stroke of the slidable block in the track angle adjusting mechanism, maximum adjustment angles in forward and reverse directions of the track can be limited.

The exemplary implementations of the present invention have been described in detail above, but the present invention is not limited to the specific details in the above implementations, and various equivalent variations may be made to the technical solution of the present invention within the scope of the technical idea of the present invention. Such equivalent variations are all within the protection scope of the present invention.

What is claimed is:

1. A pipeline patrol inspection robot having variable tracks for moving through a pipeline, comprising:
   a robot body;
   track assemblies symmetrically disposed on a left side and a right side of the robot body; and
   two movement driving mechanisms,
   wherein the robot body is connected to the track assemblies on the left side and the right side by track fixtures, and track angle adjusting mechanisms are respectively connected between the robot body and the track assemblies on the left side and the right side, wherein each of the track angle adjusting mechanisms comprises:
  a sliding rail connected to the robot body,
  a push rod motor mounted to the sliding rail,
  a power output shaft of the push rod motor driving a slidable block movable back and forth on the sliding rail,
  a four-link mechanism mounted to the slidable block, wherein the four-link mechanism of each of the track angle adjusting mechanisms comprises a lower link, an upper link, and two side links, wherein a first end of the lower link of each four-link mechanism is mounted to a lower pin shaft by using a revolute pair, wherein a second end of the lower link of each four-link mechanism is mated with a ball head of one of the track assemblies, wherein lower parts of the two side links of each four-link mechanism are connected to a corresponding lower pin shaft by a corresponding revolute pair, and upper parts of the two side links of each four-link mechanism are connected to an upper pin shaft by the corresponding revolute pair, wherein the two movement driving mechanisms are symmetrically disposed on a front of the robot body, and each of the two movement driving mechanisms comprises a servo motor, a reinforcing link, and a universal joint, wherein the servo motor of each of the two movement driving mechanisms is fixed to an inner bottom plate of the robot body and is connected to the reinforcing link of the corresponding one of the two movement driving mechanisms, wherein a first end of the universal joint of each of the two movement driving mechanisms is connected to the reinforcing link of the corresponding one of the two movement driving mechanisms, and a second end of the universal joint of each of the two movement driving mechanisms is connected to a driving wheel of the corresponding one of the track assemblies, such that the pipeline patrol inspection robot automatically adjusts the mechanisms to adapt to varying pipe diameters.

2. The pipeline patrol inspection robot having variable tracks according to claim 1, wherein each of the track assemblies comprises the driving wheel, a tensioner, a support wheel, and a track fixing side plate, the track fixing side plates are respectively disposed on inner sides of the track assemblies on the left side and the right side of the robot body, the driving wheel and the tensioner of each of the track assemblies are respectively located at a front end and a rear end of one of the track assemblies, and the support wheel of each of the track assemblies is disposed in a middle section of each of the track assemblies.

3. The pipeline patrol inspection robot having variable tracks according to claim 2, wherein a three-dimensional force sensor is disposed on the tensioner of each of the track assemblies on the left side and the right side.

4. The pipeline patrol inspection robot having variable tracks according to claim 2, wherein the ball head of each of the track assemblies is disposed on the track fixing side plate of each of the track assemblies.

5. The pipeline patrol inspection robot having variable tracks according to claim 1, wherein the track fixtures comprise four track fixtures symmetrically mounted in the robot body in front-to-rear and left-to-right directions, a symmetrical plane where each of the track fixtures are mounted in the front-to-rear direction is a plane where each of the four-link mechanisms is located, a mounting height is a height of a transverse central axis of a track fixing side plate of each of the track assemblies, each of the track fixtures has a herringbone structure, a first end of each of the track fixtures is hinged to the track fixing side plate of each of the track assemblies by using a spherical hinge, and two branches protruding from a second end of each of the track fixtures are connected to the robot body.

6. A control method for the pipeline patrol inspection robot having variable tracks of claim 1, wherein each of the track assemblies comprises the driving wheel, a tensioner and a three-dimensional force sensor disposed on the tensioner of each of the track assemblies, and wherein the method further comprises the following steps:

step 1: sampling Y-axis direction force values and Z-axis direction force values outputted by the three-dimensional force sensor at a sampling frequency of 100 Hz, and performing filtering by using a median averaging algorithm to obtain a Y-axis direction force $F_{Y1}$ and a Z-axis direction force $F_{Z1}$ of the track assembly on the left side of the robot and a Y-axis direction force $F_{Y2}$ and a Z-axis direction force $F_{Z2}$ of the track assembly on the right side of the robot;

step 2: calculating a ratio of the Y-axis direction force to the Z-axis direction force for each of the track assembly on the left side of the robot and the track assembly on the right side of the robot, which are $\alpha 1$ and $\alpha_2$, wherein $$\alpha_1 = \frac{F_{Y1}}{F_{Z1}}, \alpha_2 = \frac{F_{Y2}}{F_{Z2}} \tag{1}$$

step 3: calculating a determination basis for track camber angle adjustment, and selecting a proper control algorithm:

$$\Delta_1 = |\alpha_1| - \delta \tag{2}$$

$$\Delta_2 = |\alpha_2| - \delta \tag{3}$$

$$\eta = \alpha_1 \alpha_2 \tag{4}$$

$$\mu = \Delta_1 - \Delta_2 \tag{5}$$

wherein $\delta$ is a set positive threshold, and when $\alpha_1 > \delta$ and $\alpha_2 > \delta$, the track assembly on the left side of the robot and the track assembly on the right side of the robot are both required to be expanded outward;

when $-\alpha_1 > \delta$ and $-\alpha_2 > \delta$, the track assembly on the left side of the robot and the track assembly on the right side of the robot are both required to be retracted inward;

in the above two states, the two push rod motors are simultaneously controlled by using a gradient descent method, to adjust a track camber angle to quickly approximate an optimal state, that is, $\Delta_1 \leq 0$ or $\Delta_2 \leq 0$;

in case of approximating the optimal state, that is, $\Delta_1 \leq 0$ or $\Delta_2 \leq 0$, or when the track assembly on the left side of the robot and the track assembly on the right side of the robot are both required to be adjusted clockwise/counterclockwise, that is, $\Delta_1 > 0$, $\Delta_2 > 0$, and $\eta < 0$, a "fixing one while moving the other" proportional-integral (PI) control method is adopted, and the "fixing one while moving the other" PI control method comprises the following: if $\eta > 0$, PI control is performed on only a left push rod motor to adjust a camber angle of the track assembly on the left side of the robot so that $\alpha_1=0$, and on the contrary, PI control is performed on only a right push rod motor to adjust a camber angle of the track assembly on the right side of the robot so that $\alpha_2=0$, until an optimal state of contact between a track surface and a pipe wall is realized, that is, $\alpha_1=0$ and $\alpha_2=0$; and step 4: when the robot passes through a diameter-varying area of the pipeline or an irregular pipeline area, automatically monitoring a state of the contact between the track assemblies and the pipe wall by steps 1-3, if it is detected that the track is in a non-optimal state, first adjusting a universal joint to a proper angle by using a servo motor, and then automatically adjusting the track camber angle to the optimal state by using the track angle adjusting mechanisms, wherein the above steps 1-4 are adaptive adjustment steps of the track camber angle, the movement of the robot is realized by the movement driving mechanisms, and steering of the robot is controlled by using a left and right track differential method.

\* \* \* \* \*